Feb. 12, 1952     W. G. KAHLERT     2,585,251
SANITARY BAG FOR ANIMALS

Filed July 31, 1946     5 Sheets-Sheet 1

Inventor
William G. Kahlert
By Robert M. Dunning
Attorney

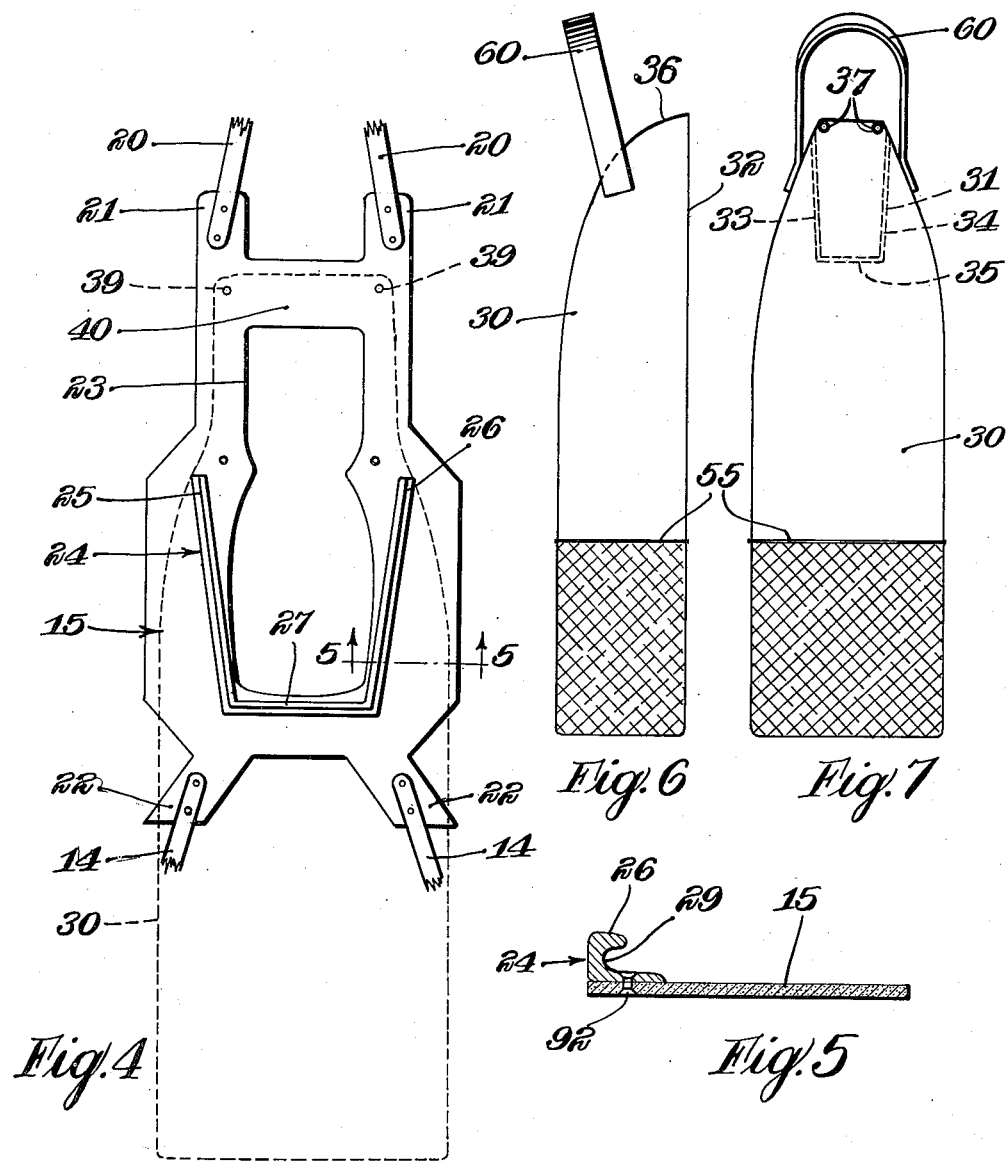

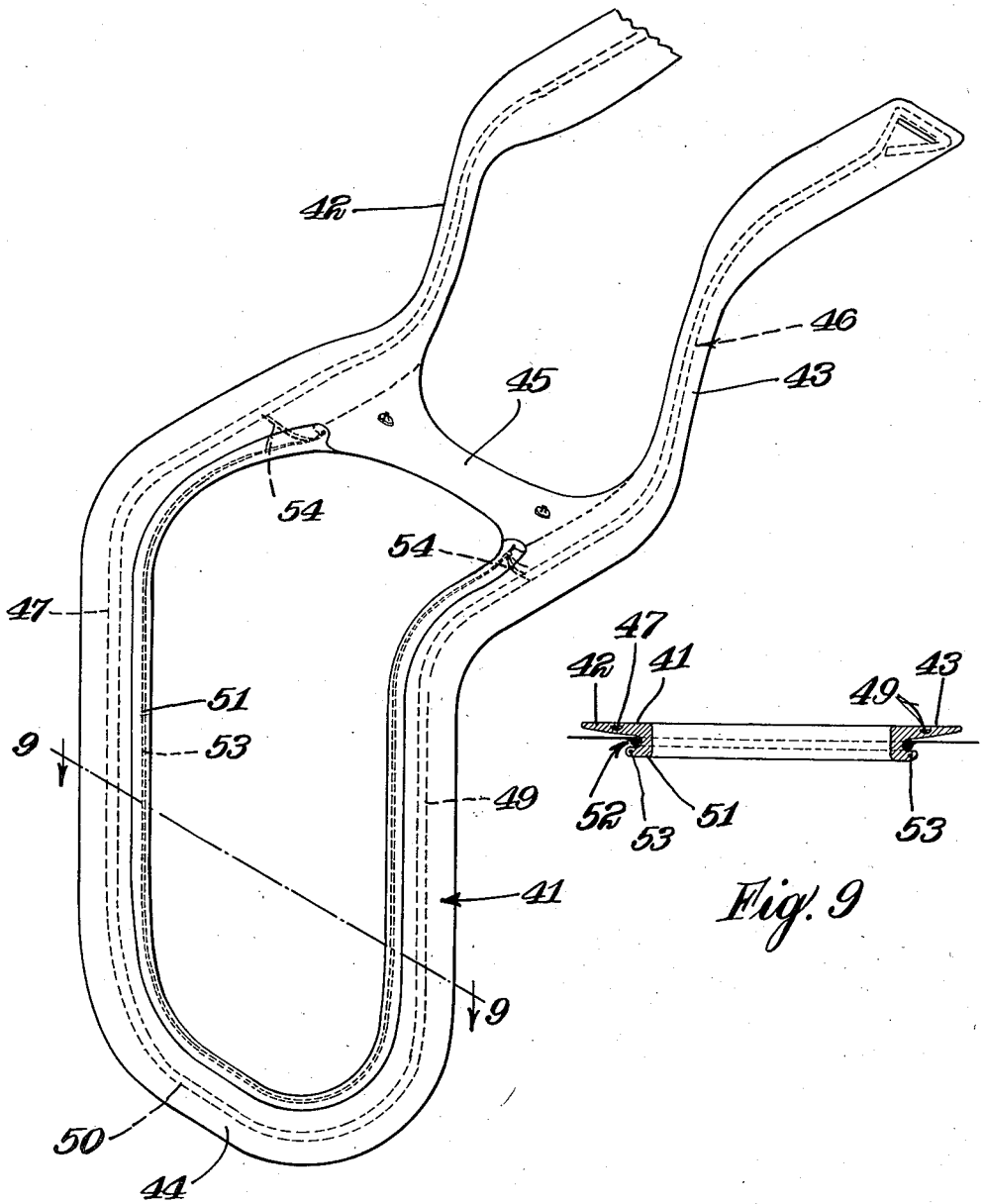

Feb. 12, 1952 — W. G. KAHLERT — 2,585,251
SANITARY BAG FOR ANIMALS
Filed July 31, 1946 — 5 Sheets-Sheet 4
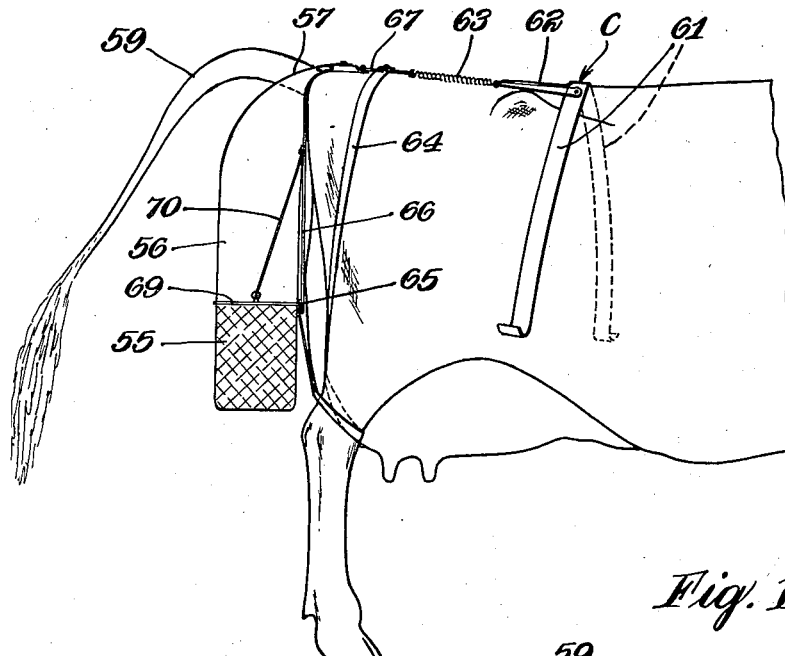
Fig. 10
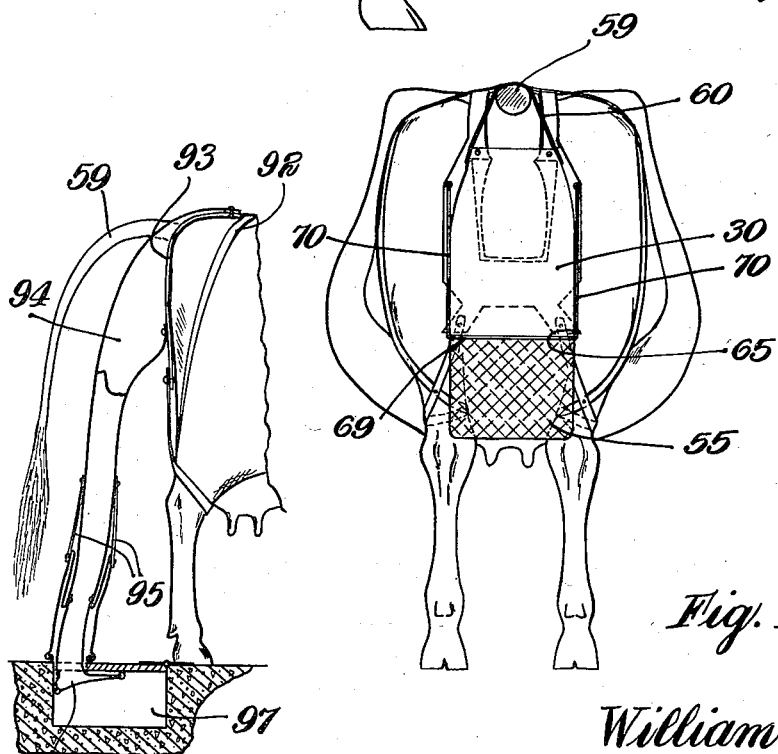
Fig. 11
Fig. 16
Inventor
William G. Kahlert
By Robert M. Dunning
Attorney Feb. 12, 1952 — W. G. KAHLERT — 2,585,251
SANITARY BAG FOR ANIMALS
Filed July 31, 1946 — 5 Sheets-Sheet 5
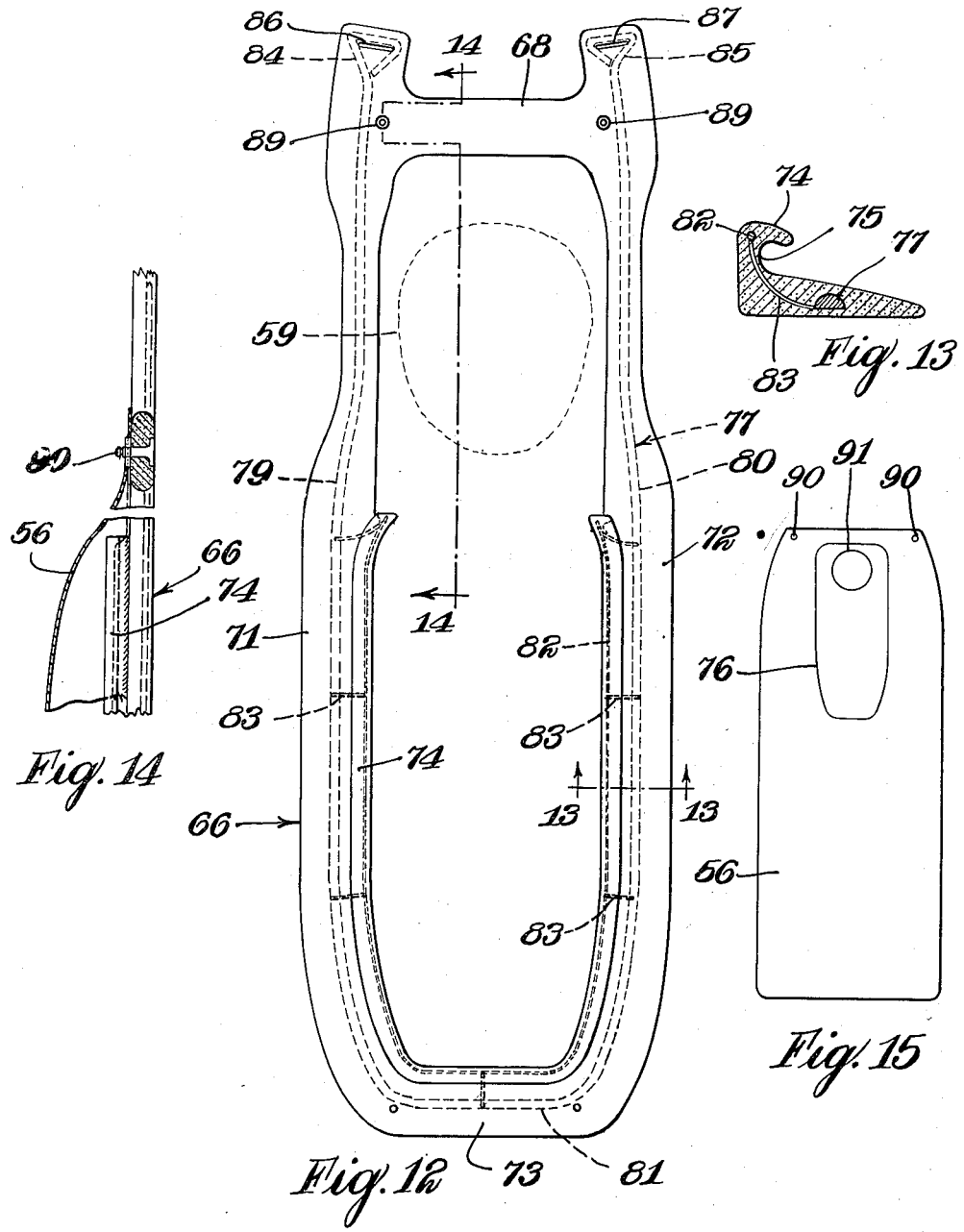

Patented Feb. 12, 1952

2,585,251

UNITED STATES PATENT OFFICE 2,585,251

SANITARY BAG FOR ANIMALS

William G. Kahlert, St. Paul, Minn.

Application July 31, 1946, Serial No. 687,295

8 Claims. (Cl. 119—95)

1

My invention relates to an improvement in sanitary bag and deals more particularly with a bag designed to catch and contain excreta of cows and the like.

In handling cows, it is usual practice to place in each stall, straw or similar material, upon which the cow may rest. This straw also acts to absorb liquid and to mix with the excreta of the animals to permit more easy removal thereof. At intervals the litter is removed from the stalls and replaced with fresh straw. In the meantime, however, the shanks and rear flanks of the animals, as well as the udders, collect a certain amount of the excreta. As a result the milk obtained from the cows is often contaminated.

It is the object of the present invention to provide a sanitary bag of flexible material which is supported by the animal in a manner to catch the excreta therefrom. As a result it is possible not only to prevent the stalls from being unnecessarily littered, but also to prevent the body of the cow from being contaminated by this excreta.

In recent years the value of liquid manure as fertilizer has been clearly demonstrated. It is an object of the present invention to provide a means of producing liquid manure not mixed with straw and other such materials.

A feature of the present invention lies in providing a means of supporting a sanitary bag in proper position to catch excreta and to so support this bag as to obviate discomfort to the cow or other animal. While my apparatus is particularly useful for cows, in view of the fact that these animals produce milk for human consumption, it is similarly useful for various other types of farm animals.

An added feature of the present invention resides in the provision of a flexible frame or bag support which extends over the thighs of the animal and extends slightly above the tail head. This frame is supported by suitable means to permit free movement of the head and legs of the cow without interference. The frame serves as a removable support for the bag so that the bag may be emptied or replaced when necessary.

A feature of the present invention lies in the fact that through constant use of my sanitary bags, a stable or stall may be kept just as sanitary as any other portion of the farm. My bags do much toward promoting sanitation and cleanliness and also are of considerable assistance in preventing the spread of disease.

These and other objects and novel features of my invention will be more clearly and fully set forth in the following specification and claims.

2

In the drawings forming a part of my specification:

Figure 4 is an enlarged diagrammatic view of the frame or saddle used to support my sanitary bag.

Figure 5 is an enlarged cross sectional view through a portion of the supporting frame of Figure 4, the position of the section being indicated by the line 5—5 of Figure 4.

Figure 6 is a side elevational view on a reduced scale of the bag which may be used in conjunction with the saddle or frame of Figure 4.

Figure 7 is a rear elevational view on a reduced scale of the bag used in conjunction with the saddle of Figure 4.

Figure 8 is a perspetiive view of a modified form of frame or saddle showing the construction thereof.

Figure 9 is a sectional view through the frame or saddle of Figure 8, the position of the section being indicated by the line 9—9 of Figure 8.

Figure 10 is a side elevational view of the rear quarters of a cow showing a modified form of sanitary bag attached thereto.

Figure 11 is a rear elevational view with parts in section of a cow showing the bag attached thereto, as in Figure 10.

Figure 12 is a diagrammatic view of a modified form of frame or saddle showing the construction thereof.

Figure 13 is a sectional view through a portion of the frame or saddle, the position of the section being indicated by the line 13—13 of Figure 12.

Figure 14 is a sectional view through another portion of my frame shown in Figure 13, the position of the section being indicated by the line 14—14 of Figure 12.

Figure 15 is a rear elevational view of a bag used in conjunction with the frame or saddle.

Figure 16 is a diagrammatic view showing a modified form of construction.

Figure 1:
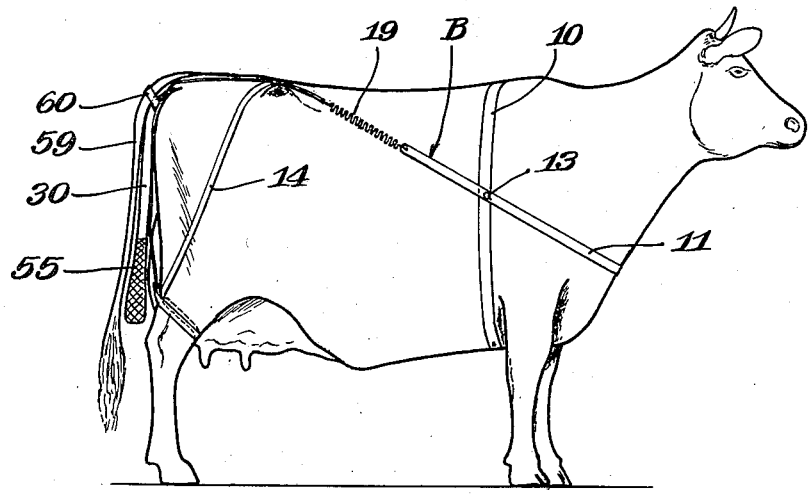
Figure 1 illustrates a side elevational view of a cow with my sanitary bag in supported position thereupon.
Figure 2:
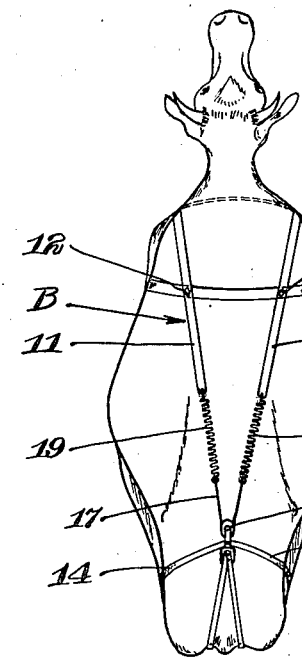
Figure 2 is a top plan view of the cow shown in Figure 1 illustrating a type of harness which may be used to hold the bag in place.
Figure 3:
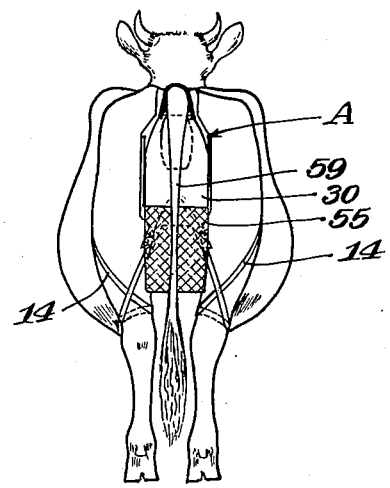
Figure 3 is a rear elevational view of the cow showing the bag in proper position.

As best illustrated in Figures 1, 2, and 3, the frame or saddle A is supported upon the cow or other animals by means of a suitable harness. One form of such harness is shown in Figures 1, 2, and 3 to illustrate the type of construction which may be used. The harness B may be used with any of the forms of construction later described, and has been found to provide sufficient freedom for the normal movements of the animal. The frame B includes a strap or band 10 which is designed to encircle the heart girth of the animal immediately behind the forelegs. The strap 10 is fastened by means of a buckle or the like, not illustrated in the drawings, but common to such straps. A second strap 11 extends around the front of the animal above the dewlap and is secured on opposite sides of the animal to the strap 10 at points 12 and 13.

The strap 14 extends over the rump of the animal adjacent the hips and extends downwardly on either side of the animal. Each end of the strap 14 encircles a rear leg of the animal above the hock and is terminally connected to the frame or saddle 15. At the center of the back of the animal a pulley 16 is provided for accommodation of a short cord or cable 17. The ends of the cable 17 are each connected by a spring 19 to one end of the strap 11. Thus the straps 10 and 11 hold the portion of the strap 14 extending over the rump of the animal from sliding rearwardly. The animal may have free movement of its neck and shoulders, the cable 17 sliding through the pulley 16 to compensate for such movement. At the same time the animal may freely raise and lower its head, the springs 19 compensating for any elongation or contraction. The frame or saddle 15 is connected by means of straps 20 to the strap 14 adjacent the mounting point of the pulley 16. As a result the upper end of the frame 15 is held from sliding downwardly on the thighs of the animal. The frame 15 is provided with upwardly extending projections 21 which extend on opposite sides of the tail head to permit the straps to connect with the straps 14 centrally of the back of the end of the frame 15.

The frame 15 is generally rectangular in shape, but the lower portion thereof is preferably somewhat wider than the upper portion thereof to provide a proper support for my sanitary bag. Downwardly extending projections 22 at the lower end of the frame 15 are connected to the ends of the strap 14. The connection between the projections 22 and the strap 14 may be removable or buckles may be provided, not illustrated in the drawings, by means of which the strap may be readily detached.

The saddle or frame 15 has an elongated center aperture 23 therein. Adjacent this aperture and projecting outwardly from the surface of the frame I provide a substantially U-shaped rib 24 having slightly diverging sides 25 and 26 and a connecting bottom 27. This ridge is provided with a groove 29 in its outer side as illustrated in Figure 5 of the drawings. This groove 29 interlocks with the sanitary bag attached to the frame so as to hold the bag securely in place relative to the frame.

As best illustrated in Figures 6 and 7 of the drawings the sanitary bag 30 is of elongated form and preferably tapers inwardly to some extent at its upper extremity for attachment with the frame 15. The bag 30 is provided with an elongated aperture 31 near its upper extremity on the forward surface 32 thereof, which is positioned next adjacent the rear of the animal. The sides 33 and 34 of the aperture 31 engage in the groove 29 in the sides 25 and 26 of the frame 15. The lower edge 35 of the aperture 31 engages in the groove 29 in the bottom edge 27 of the projecting ledge 24. Thus the edges of the aperture 31 interlock with the rib 24 and the bag is thus held close to the frame adjacent the lower portion of the aperture.

As also indicated in Figure 6 of the drawings the bag 30 preferably tapers toward the forward side 32 thereof and is thus provided with a tapering upper end 36. Snap sockets 37 or equivalent fastening means cooperate with suitable projections 39 on the frame 15 to hold the upper edge of the bag closely adjacent the cross member 40 of the frame 15. This cross member 40 is preferably positioned immediately below the tail of the cow and is held in this position by the straps 20 and the harness B.

When the bag is in place the cross member 40 is positioned between the tail of the animal and the anus, and the bag opening, and the opening 23 is in position to receive excreta from the animal. As a result the floor of the stall is not soiled and remains in a sanitary condition constantly. At intervals the bag 30 is removed and emptied into a suitable tank and replaced upon the frame 15.

In Figure 8 of the drawings I disclose a somewhat similar construction which, however, is possessed of a slightly different shape. In the construction shown in Figure 8, a frame 41 takes the place of the frame 15 previously described. The frame 41 includes a pair of substantially parallel side members 42 and 43 which are connected at their lower extremity by a cross member 44. A cross member 45 is likewise provided between the ends of the frame or saddle 41. The frame 41 is preferably formed of plastic, rubber, or synthetic rubber, and a stiffening member 46 of metal or the like is embedded within the frame. The stiffening member 46 includes parallel sides 47 and 49 which are embedded within the sides 42 and 43 and a connecting bottom portion 50 which is embedded within the bottom connecting member 44 of the frame. This stiffening member 46 is sufficiently rigid to maintain a desired shape and as a result the frame may be to some extent modeled to fit the contour of the thighs and rear quarters of the cow.

An outstanding ridge or bead 51 extends along the sides 42 and 43 of the frame from the lower end 44 to the cross member 45 this bead forming a substantially U-shaped projection having an annular groove 52 in its outer surface. A reinforcing member such as 53 may if desired be embedded in the bead 51 to stiffen this bead and the reinforcing member 53 may if desired be connected to the reinforcing member 46 by cross connections 54. The groove 52 acts to receive the marginal edge of the aperture 31 of the bag 30 so as to hold the bag closely adjacent the frame 41.

As will be noted in Figure 8, the frame is bent so as to position the cross member 45 just below the tail of the animal. In some instances the rear of the animal projects rearwardly just below the tail forming a ledge on which the cross member 45 may rest.

The bag 30 may be reinforced by a mesh enclosure 55 if it is so desired to strengthen the lower end of the bag. In preferred form the bag is formed of light material such as certain of the set plastics and may be a modified or cyclized rubber product such as is at present manufactured by several firms. The material of the bag is water-proof, flexible and light in weight to accomplish the proper result.

In Figure 10 of the drawings I disclose a construction somewhat similar to that previously described, but embodying a bag 56 which is apertured at 57 to receive the tail 59 of the animal. In this arrangement the tail of the animal tends to spread the walls of the bag apart at the top so as to open the bag fully. This arrangement differs somewhat from the construction shown in Figure 11 of the drawings in which a strap 60 is provided on the bag for extending over the tail 59 of the animal to serve a somewhat similar purpose. The strap 60 is shown attached to the bag 30 in Figure 6 of the drawings so that the elevation of the tail will spread apart the upper portion of the bag. In Figure 10 of the drawings a harness C is illustrated which differs somewhat from the harness B previously described. The harness C may be used in place of the harness B with any of the frames or bag structures illustrated. The harness C includes a spring band 61 which is of inverted U-shape and which embraces the animal just forwardly of the hips. The upper portion of the band 61 is connected at 62 to a spring 63 which in turn is connected centrally to a strap 64 similar in position and purpose to the strap 14 previously described. The ends of the strap 64 each encircle a rear leg of the animal in the manner illustrated and are terminally connected at 65 to the saddle or frame 66 which will be later described. The upper end of the saddle or frame 66 is connected by straps 67 or other suitable means to the springs 63.

Figure 10 also illustrates an auxiliary support for the bag 56 which is provided with the bag reinforcing 55 previously described. The upper edge 69 of the reinforced bag 55 is connected by straps 70 or other suitable means to the saddle or frame 66 at a point spaced above the top of the reinforcing bag 55. As a result the bag 56 is supported securely by the frame.

With reference now to Figure 12 of the drawings the frame 66 will be shown in detail. The frame 66 is substantially rectangular in form including spaced sides 71 and 72 and an integral bottom 73. The cross member 68 connects the upper ends of the sides 71 and 72 at a point spaced below the upper ends of these sides. An open frame is thus provided having a substantially rectangular opening therethrough.

A beaded edge 74 is provided along the lower portion of the sides 71 and 72 and along the bottom 73. This beaded edge 74 projects rearwardly from the frame 66 to provide a means of locking the bag 56 thereto. The beaded edge 74 is best illustrated in Figure 13 of the drawings and includes a peripheral groove 75 which is slidably engageable with the edges of the bag aperture 76. As a result the lower portion of the bag aperture is held tightly against the frame 66 so as to hold the aperture close to the rear of the animal.

A reinforcing element 77 is preferably embedded in the frame 66 in the manner illustrated. This reinforcing member 77 may comprise a U-shaped member of metal or the like having substantially parallel sides 79 and 80 and a connecting bottom 81 embedded in the sides 71 and 72 and the bottom connecting member 73 of the frame. A reinforcing wire 82 may likewise be providel in the beaded edge 74, this wire 82 likewise being substantially U-shaped in form to conform to the shape of the beaded edge 74. The reinforcing members 82 and 77 may be connected at spaced intervals by connecting members 83 if desired to hold the bead 74 in proper relation to the frame.

The upper ends of the reinforcing member 77 are bent to form loops 84 and 85, respectively. Apertures 86 and 87 extend through the frame sides 71 and 72 through the loops 84 and 85 thus formed. Thus the loops tend to reinforce the portion of the frame engaged by the supporting straps 67.

As best illustrated in Figure 12 of the drawings a pair of snap buttons 89 are provided adjacent the top cross member 68 which buttons are engageable with suitable sockets 90 at the upper edge of the bag 56. As a result the upper edge of the bag is held securely to the frame 66. The cross member 68 is positioned above the tail 59 of the animal so that the tail extends through the aperture in the frame 66. Accordingly an aperture 91 may be formed in the bag 56 through which the tail 59 may extend. When the tail of the animal is lifted it acts to spread the walls of the bag apart so that the bag is fully opened.

The operation of the apparatus has been described in conjunction with the construction of the bag. Various materials can be used to form the parts of the apparatus. For example the frame 15 as shown in Figure 5 comprises a leather or rubber body having a beaded ledge 26 secured to one surface thereof by any suitable means such as the rivets 92. The reinforcing members such as 46 and 77 permit the frames in which they are embodied to be bent are formed in any desired shape to fit the contour of the animal. At the same time the upper ends of these reinforcing members act to reinforce the connection between the frames and the supporting straps. The upper end of the bag may be opened either by a strap such as 60 extending over the tail of the animal or by passing the tail of the animal through the upper portion of the bag as described. In any event the excreta of the animal is caught and contained in the sanitary bag and may be disposed of at intervals.

Figure 16 shows an open ended bag or tube of flexible material through which excreta may be conveyed to a partially covered trough adjacent a stall. A frame or saddle 93, similar to one of those previously described, is supported on the rear end of the cow by a harness 92 in the manner previously described. A tubular body 94 through a wall of which the tail 59 of the cow extends, is secured to the saddle 93. The tubular body 94 is telescoped together and resiliently held in this position by the connectors 95. The tubular body 94 is anchored at 96 within a trough 97, extending through an aperture in the covering therefor. Excreta is conducted through the tubular member into the trough 97, thus preventing the floor of the stall from becoming littered, and improving sanitary conditions of the barn.

In accordance with the patent statutes, I have described the principles of construction and operation of my sanitary bag construction and while I have enedavored to set forth the best embodiments thereof, I desire to have it understood that these are only illustrative thereof, and that obvious changes may be made within the scope of the following claims without departing from the spirit of my invention.

I claim:

1. A sanitary apparatus for animals comprising an apertured frame, a harness for securing said frame to overlie the rear of the animal rearwardly of the thighs, said harness including U-shaped spring means extending over the body of the animal forwardly of the rear legs, to permit free movement of the animal, and a sanitary bag removably secured to said frame, said frame and bag having aligned apertures therethrough.

2. A sanitary apparatus for animals including a frame member having a wide flat bearing surface designed to overlie the rear of the thighs of the animal, said frame member having an aperture therethrough, and an outstanding rib partially encircling said aperture, a bag having an aperture therein, and a peripheral groove in the outer surface of said rib removably engageable with the portion of said bag encircling the aperture therein, and fastening means holding the bag engaged with said rib.

3. A sanitary apparatus for animals comprising a saddle having a wide flat bearing surface designed to overlie the rear of the flanks of the animal, said saddle having an aperture therethrough, an outwardly projecting rib partially encircling said aperture, said rib having a peripheral groove extending thereabout on the outer surface thereof, a bag having an aperture therein, the material of the bag adjacent said aperture being removably engageable in said groove, and means for removably holding said bag to said saddle at a point above the aperture therein.

4. A sanitary apparatus for animals including an apertured frame, a bag having an aperture near its upper end arranged to register with said first named aperture, means for securing said bag with said bag aperture immediately below the tail of the animal and adjacent the animal, a reinforcing means encircling and enclosing the lower end of said bag, and individual supporting means connecting said frame and said reinforcing means for individually supporting said reinforcing means.

5. A sanitary apparatus for animals including a frame having a wide flat bearing surface and having an elongated aperture therein, means for supporting said frame overlying the rear of the thighs on an animal, a flexible bag having an aperture therein, interlocking means on said bag and on said frame to hold the lower portion of said aperture in registry with and closely adjacent the aperture in said frame, said interlocking means engaging the bag and frame upon upward movement of the bag relative to the frame, and detachable connecting means for holding the upper portion of said bag to the upper portion of said frame to hold the apertures in said frame and bag in registry.

6. A sanitary apparatus for animals comprising a wide flat saddle, said saddle being formed of relatively flexible material and embodying a stiffening element of relatively less flexible material, said frame having an aperture therethrough, a U-shaped rib projecting outwardly from the frame along opposite sides and the lower edge of the aperture, said rib having a peripheral groove therein, a bag having an aperture therein at a point spaced from the upper end thereof, the bag edges of the bag aperture engaging in said groove, and means above said apertures supporting said bag to said frame with said aperture in registry.

7. A sanitary apparatus for animals including a wide flat frame, said frame being formed of flexible material having an aperture therethrough, a generally U-shaped rib projecting from said frame about opposite sides and the bottom of said aperture, said rib having a peripheral groove on the outer surface thereof, a flexible bag having an aperture therein, the portions of said bag adjacent the aperture being engageable in the groove and held in fixed relation to the frame thereby, said bag being engaged with an upward movement of the bag relative to the frame, means cooperable between the bag and frame for holding the frame and bag with the apertures therein aligned.

8. The structure described in claim 7 and including a harness engageable with the upper portion of the frame to hold the frame in place, and means connected to the lower end of the frame and designed to encircle the rear legs of the animal for holding the frame in place.

WILLIAM G. KAHLERT.

REFERENCES CITED

The following references are of record in the file of this patent:

UNITED STATES PATENTS

| Number | Name | Date |
|---|---|---|
| 453,846 | McNair | June 9, 1891 |
| 718,915 | Cooper | Jan. 20, 1903 |
| 726,166 | Irons | Apr. 21, 1903 |
| 881,753 | Whitehouse | Mar. 10, 1908 |
| 900,783 | Roberts | Oct. 13, 1908 |
| 1,154,073 | Stocking | Sept. 21, 1915 |
| 1,162,359 | Horiuch | Nov. 30, 1915 |
| 1,175,773 | Khoubesserian | Mar. 14, 1916 |
| 1,794,700 | McCaskey | Mar. 3, 1931 |
| 2,173,356 | Cross | Sept. 19, 1939 |
| 2,247,431 | Behrens | July 1, 1941 |
| 2,426,716 | Telford | Sept. 2, 1947 |